United States Patent
Kwon

(10) Patent No.: US 10,887,762 B2
(45) Date of Patent: Jan. 5, 2021

(54) METHOD AND APPARATUS FOR TRANSMITTING AND RECEIVING DATA USING BLUETOOTH TECHNOLOGY

(71) Applicant: LG ELECTRONICS INC., Seoul (KR)

(72) Inventor: Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 16/339,643

(22) PCT Filed: Sep. 29, 2017

(86) PCT No.: PCT/KR2017/010952
§ 371 (c)(1),
(2) Date: Jun. 26, 2019

(87) PCT Pub. No.: WO2018/066925
PCT Pub. Date: Apr. 12, 2018

(65) Prior Publication Data
US 2019/0320315 A1    Oct. 17, 2019

Related U.S. Application Data

(60) Provisional application No. 62/404,737, filed on Oct. 5, 2016, provisional application No. 62/443,845, filed on Jan. 9, 2017.

(51) Int. Cl.
*H04W 4/12*     (2009.01)
*H04W 12/00*    (2009.01)
(Continued)

(52) U.S. Cl.
CPC .......... *H04W 12/003* (2019.01); *H04W 4/12* (2013.01); *H04W 4/80* (2018.02); *H04W 76/10* (2018.02)

(58) Field of Classification Search
None
See application file for complete search history.

(56) References Cited

U.S. PATENT DOCUMENTS

| | | | |
|---|---|---|---|
| 2012/0052802 A1 | 3/2012 | Kasslin et al. | |
| 2016/0128112 A1* | 5/2016 | Dunsbergen | H04W 76/10 455/41.2 |
| 2017/0215030 A1* | 7/2017 | Choi | H04W 12/003 |

FOREIGN PATENT DOCUMENTS

| | | |
|---|---|---|
| WO | WO 2015/069024 A1 | 5/2015 |
| WO | WO 2015/122576 A1 | 8/2015 |
| WO | WO 2016/010347 A1 | 1/2016 |

* cited by examiner

*Primary Examiner* — Phuongchau Ba Nguyen
(74) *Attorney, Agent, or Firm* — Birch, Stewart, Kolasch & Birch, LLP

(57) ABSTRACT

The present invention relates to a method and an apparatus for a client to transmit and receive data to and from a server by Bluetooth. According to the present invention, a method and an apparatus are provided for forming a Bluetooth low energy (LE) connection with a server; and transmitting, to the server, a first read request message requesting to read a first characteristic including first coupling state information, wherein the first coupling state information is a part of a specific coupling state information indicating a state of coupling between the server and at least one of the devices; receiving, from the server, a first read response message including the first coupling state information; and receiving, from the server, an indication message including changed coupling state information included in a second characteristic if the coupling state has changed, wherein the changed coupling state information indicates the changed coupling state between the server and the at least one device.

14 Claims, 14 Drawing Sheets

(51) Int. Cl.
*H04W 4/80* (2018.01)
*H04W 76/10* (2018.01)

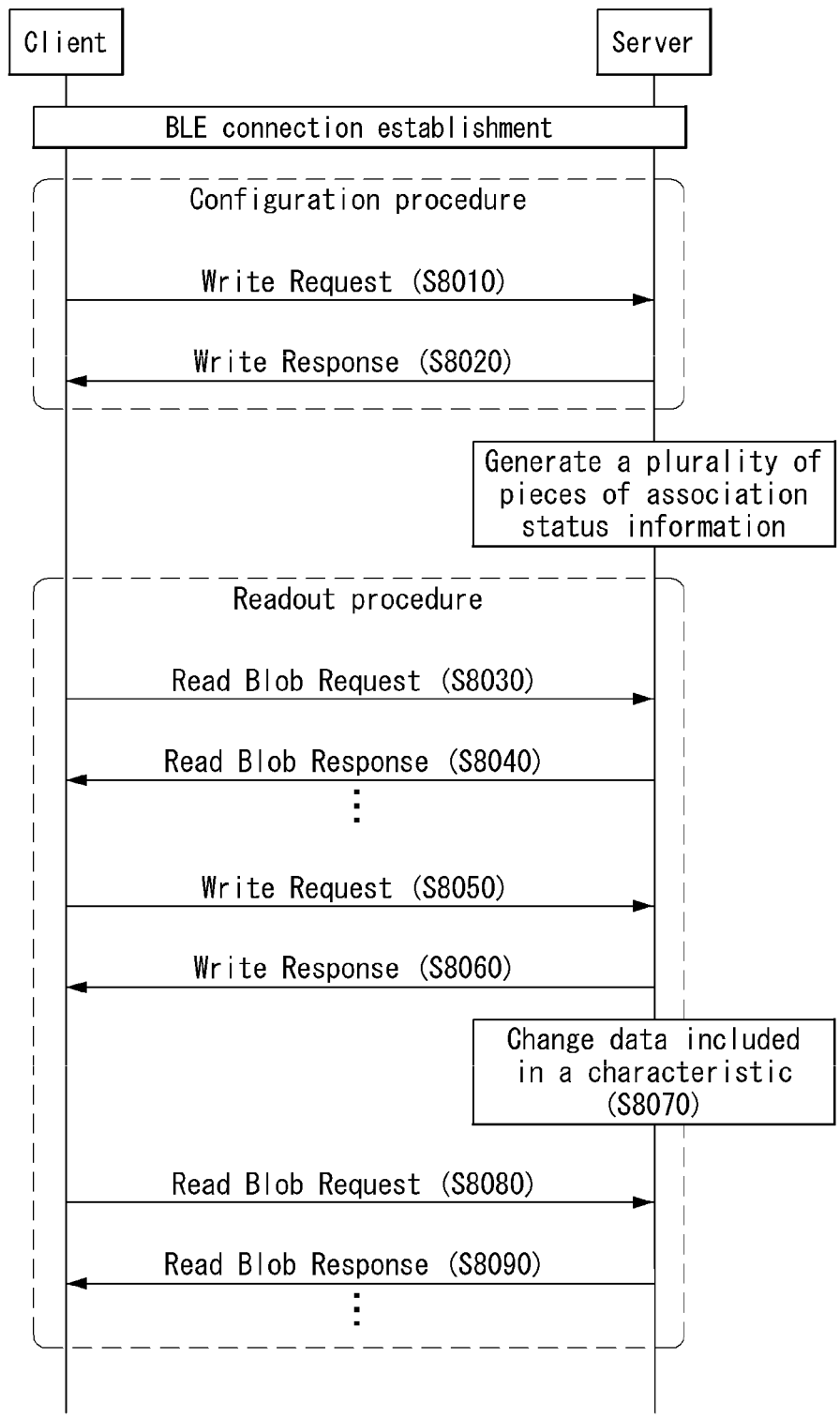

Fig. 9

| Associations Status Info (2 bytes) | Bank counter (1 byte) | Total Banks Number (1 byte) | Associations Number (1 bytes) |
|---|---|---|---|

(a) Header field

| Field | Flag | Reading Behavior Configuration | | Indication Behavior Configuration | | |
|---|---|---|---|---|---|---|
| Subfield | | Selected Association Type subfield | Association Number subfield | Indicated Association Type | Maximum Indicated Association Number | Indicated Interval |
| Length | 1byte | 2bytes | 2bytes | 1byte | 1byte | 4bytes |

(b) Configuration characteristic

| Opcode (1 byte) | Bank Counter (1 byte) |
|---|---|

(c) Control point characteristic

Fig. 10

| Client List Info (1 bytes) | Bank counter (1 byte) | Total Bank Number (1 byte) | Number of 16 bits UUID (1 bytes) | 16 bits UUID List (6 byte) | Number of 32 bits UUID (1 bytes) | 32 bits UUID List (6 byte) | Number of 128 bits UUID (1 bytes) | 128 bits UUID List (6 byte) |
|---|---|---|---|---|---|---|---|---|

(a) Client list characteristic

| Opcode (1 byte) | Bank Number (1 byte) |
|---|---|

(b) Control point characteristic

METHOD AND APPARATUS FOR TRANSMITTING AND RECEIVING DATA USING BLUETOOTH TECHNOLOGY

Cross Reference to Related Applications

This application is the National Phase of PCT International Application No. PCT/KR2017/010952, filed on Sep. 29, 2017, which claims priority under 35 U.S.C. 119(e) to U.S. Provisional Application Nos. 62/404,737, filed on Oct. 5, 2016 and 62/443,845, filed on Jan. 9, 2017, all of which are hereby expressly incorporated by reference into the present application.

TECHNICAL FIELD

The present invention relates to a method and apparatus for transmitting and receiving data by using Bluetooth, a short-range communication technology in a wireless communication system, and more particularly, to a method and apparatus for transmitting and receiving a large amount of data by using Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present invention is to provide a method and an apparatus for transmitting and receiving a large amount of data by using Bluetooth.

Also, an object of the present invention is to provide a method and an apparatus for transmitting and receiving association information related to a plurality of devices associated to a device.

Also, an object of the present invention is to provide a method and an apparatus for storing and transmitting and receiving specific information among association information of a plurality of devices associated with a device.

Also, an object of the present invention is to provide a method and an apparatus for transmitting and receiving data exceeding the size that may be stored in one characteristic.

Also, an object of the present invention is to provide a method and an apparatus for splitting data larger than a predetermined size and store the split data into one characteristic.

Also, an object of the present invention is to provide a method and an apparatus for substituting split data included in one characteristic with other split data.

Technical objects to be achieved by the present invention are not limited to those described above, and other technical objects not mentioned above may also be clearly understood from the descriptions given below by those skilled in the art to which the present invention belongs.

Technical Solution

To solve the problem described above, the present invention provides a method and an apparatus for transmitting and receiving data by a client to and from a server using Bluetooth.

More specifically, a method for transmitting and receiving data by a client to and from a server using Bluetooth according to one embodiment of the present invention comprises establishing a Bluetooth Low Energy (LE) connection to a server; transmitting, to the server, a first readout request message requesting reading of a first characteristic including first association status information, wherein the first association status information is part of specific association status information representing association status between the server and at least one device; receiving, from the server, a first readout response message including the first association status information; and when the association status is changed, receiving, from the server, an indication message including changed association status information included in a second characteristic, wherein the changed association status information represents changed association status between the server and the at least one device.

Also, the present invention further comprises transmitting, to the server, a write request message requesting writing of a configuration characteristic for configuration of the indication message; and receiving a write response message in response to the write request message, wherein the write request message includes configuration information of the indication message.

Also, according to the present invention, the configuration information includes at least one of period information representing a transmission period of the indication message, association type information representing an indicated association type, or number information representing the number of association status included in the indication message.

Also, the present invention further comprises performing a change procedure for changing information stored in the first characteristic to second association status information; transmitting, to the server, a second readout request message requesting reading of the first characteristic; and receiving, from the server, a second readout response message including the second association status information, wherein the first association status information and the second association status information are information split from the specific association status information according to a size of the first characteristic.

Also, according to the present invention, the performing a change procedure comprises transmitting, to the server, a second write request message requesting writing of a control characteristic for indicating change of information included in the first characteristic; and receiving, from the server, a second write response message indicating that information of the first characteristic has been changed in response to the second write request message.

Also, the present invention further comprises transmitting a second write request message requesting writing of a control characteristic for initializing the order of the association status included in the specific association status information; and receiving, from the server, a second write response message representing that the order of the association status has been initialized.

Also, the present invention further comprises transmitting, to the server, a second write request message requesting writing of a control characteristic indicating pairing with a specific device; and receiving a second write response message in response to the second write request message, wherein the second write request message includes control information for configuring a search mode for searching for neighboring devices by the server.

Also, according to the present invention, the search mode uses low power for a short-range search.

Also, the present invention provides a device comprising a communication unit for communicating with an external entity in a wireless and wired manner; a memory for storing data; and a processor functionally connected to the communication unit, wherein the processor is configured to establish a Bluetooth Low Energy (LE) connection to a server; transmit, to the server, a first readout request message requesting reading of a first characteristic including first association status information, wherein the first association status information is part of specific association status information representing association status between the server and at least one device; receive, from the server, a first readout response message including the first association status information; and when the association status is changed, receive, from the server, an indication message including changed association status information included in a second characteristic, wherein the changed association status information represents changed association status between the server and the at least one device.

Advantageous Effects

According to a method for transmitting and receiving data by using Bluetooth according to one embodiment of the present invention, data which is larger than a predetermined size may be transmitted and received.

Also, according to the present invention, data larger than the data size that may be stored in one characteristic is split, and the split data may be stored in one characteristic in turn.

Also, according to the present invention, by storing split data into one characteristic in turn, a large amount of data may be transmitted and received through one characteristic.

Also, according to the present invention, since a large amount of data may be transmitted through one characteristic, even if a plurality of devices are associated with one device, association information may be transmitted and received to and from the plurality of devices.

Also, according to the present invention, among a plurality of devices associated with a device, only the information of the devices forming a specific association relationship may be transmitted and received through one characteristic.

Also, according to the present invention, when the association relationship of a device is changed, only the information about the changed association relationship may be transmitted and received through a separate characteristic.

The technical effects of the present invention are not limited to the technical effects described above, and other technical effects not mentioned herein may be understood to those skilled in the art to which the present invention belongs from the description below.

DESCRIPTION OF DRAWINGS

The accompanying drawings, which are included herein as a part of detailed descriptions to help understanding the present invention, provide embodiments of the present invention and describe technical features of the present invention with detailed descriptions below.

FIG. 8 illustrates one example of a characteristic for transmitting and receiving association status information of a device proposed by the present specification.

FIGS. 9 and 10 illustrate one example of a data format and a characteristic for transmitting and receiving large-sized association status information and/or information related thereto through a specific characteristic proposed by the present specification.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
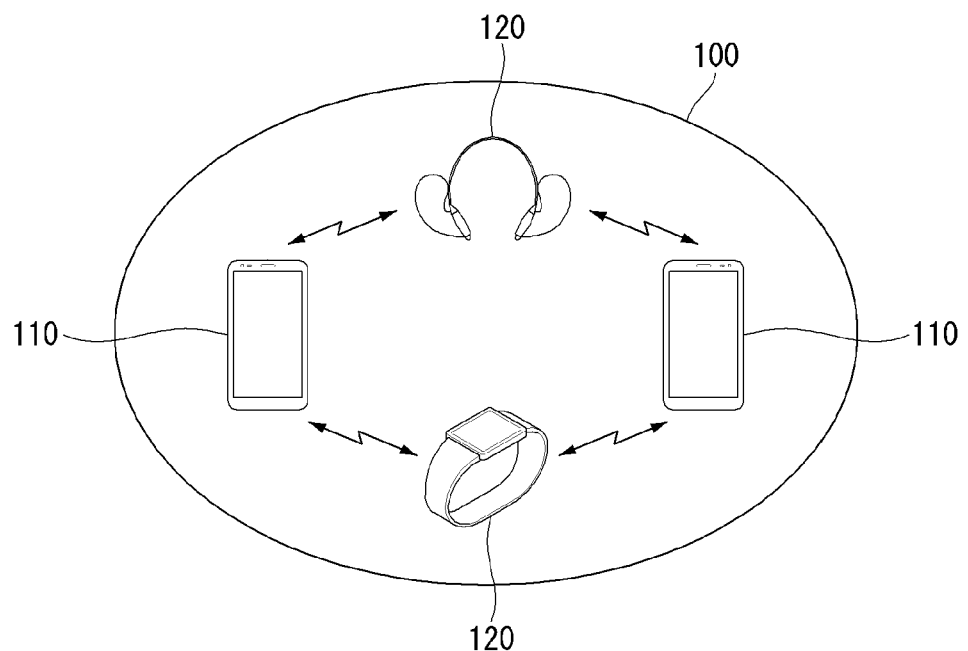
FIG. 1 is a schematic view illustrating an example of a wireless communication system using a Bluetooth low energy technology to which the present invention is applicable.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, or the like.

The client device 110 may also be called as master device, master, client, member, sensor device, sink device, collector, third device, fourth device and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
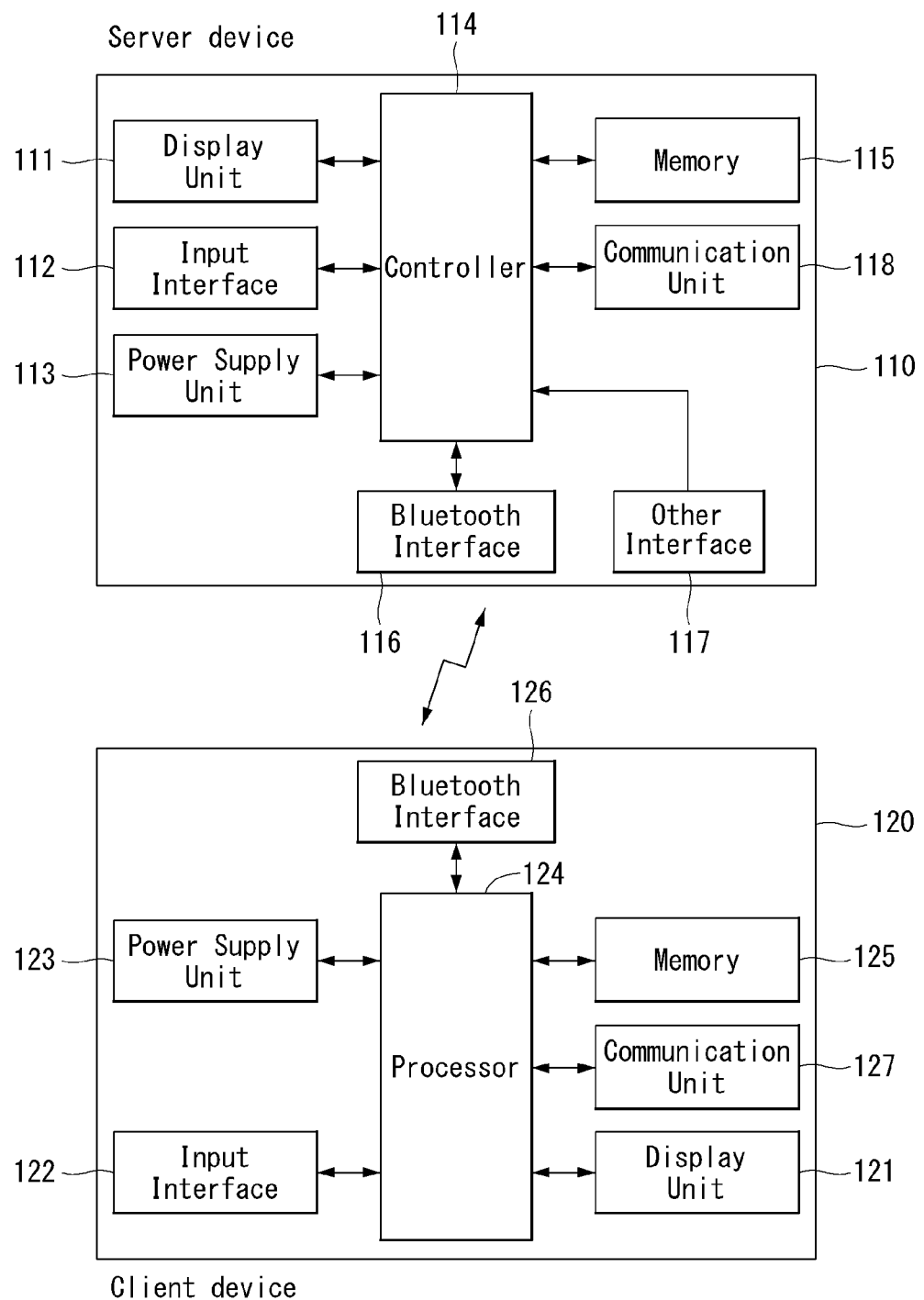
FIG. 2 illustrates one example of an internal block diagram of a device in which the methods proposed by the present specification may be implemented.

FIG. 2 illustrates one example of an internal block diagram of a device in which the methods proposed by the present specification may be implemented.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers.

As described above, BLE technology uses a small duty cycle and able to reduce power consumption considerably through a low speed data transmission rate.

The user input interfaces 112 and 122 refer to modules providing a user input such as a screen button to the controllers to enable the user to control an operation of the devices.

Figure 3:
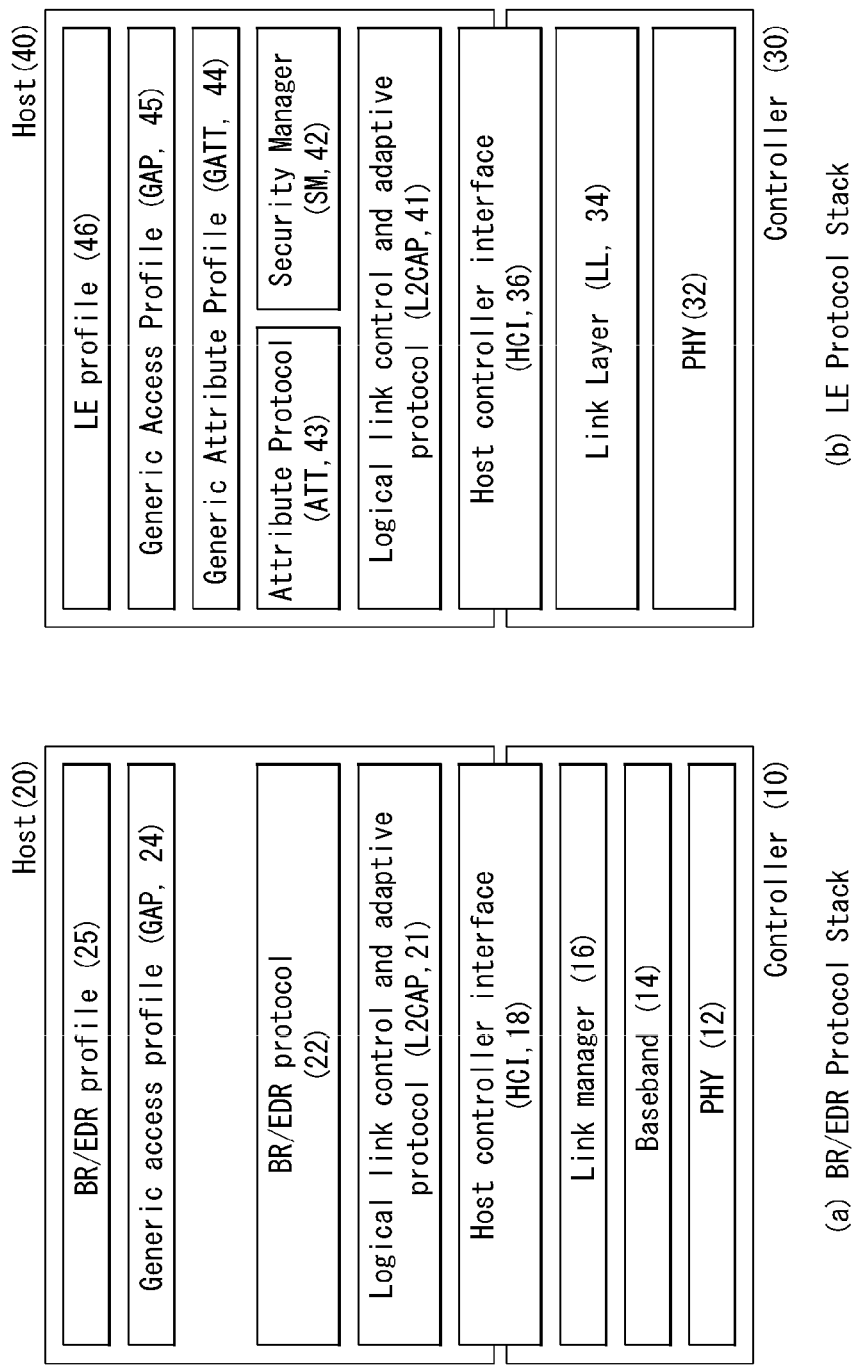
FIG. 3 illustrates one example of Bluetooth communication architecture to which the methods proposed by the present specification may be applied.

FIG. 3 illustrates one example of Bluetooth communication architecture to which the methods proposed by the present specification may be applied.

Figure 4:
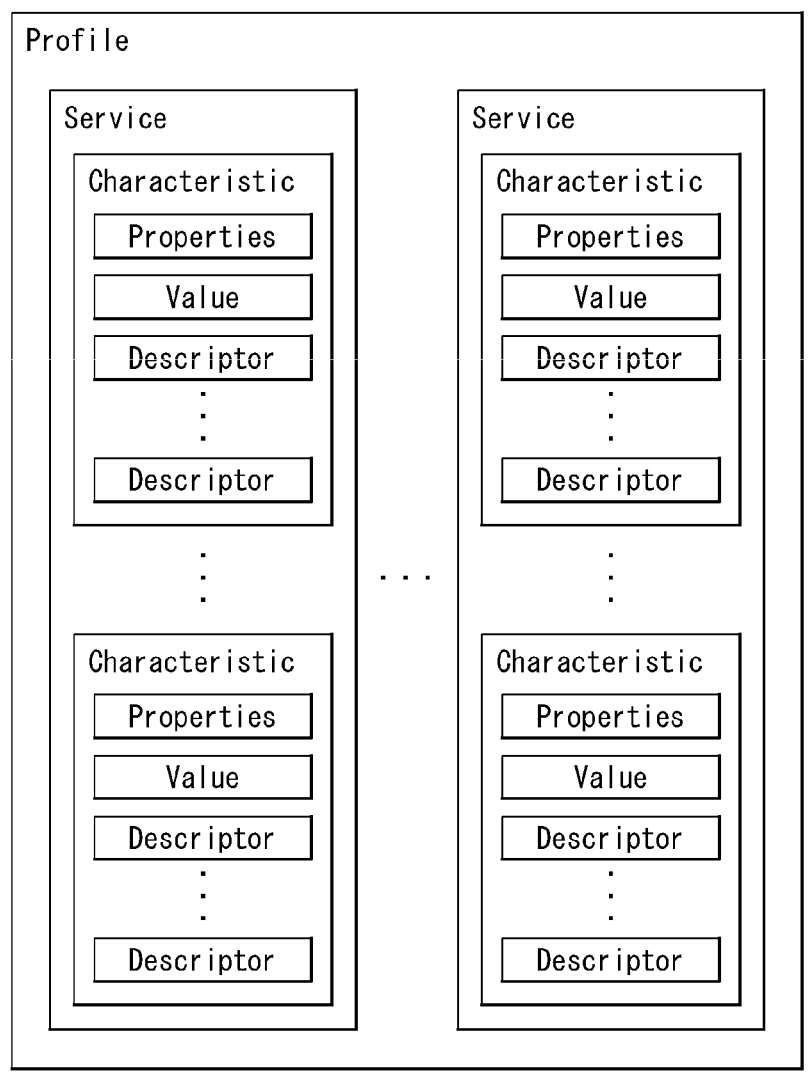
FIG. 4 illustrates one example of Generic Attribute Profile (GATT) structure of Bluetooth low energy technology.

Referring to FIG. 4, FIG. 4(*a*) shows an example of a protocol stack of Bluetooth Basic Rate (BR)/Enhanced Data Rate (EDR), and FIG. 4(*b*) shows an example of a protocol stack of Bluetooth Low Energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The controller stack 10 may include a PHY 12, link controller 14, and link manager 16.

The PHY 12 is a layer transmitting and receiving a 2.4 GHz radio signal, and when Gaussian Frequency Shift Keying (GFSK) modulation is used, the PHY layer 12 may transmit data by hopping 79 RF channels.

The link controller 14 plays the role of transmitting a digital signal, selects a channel sequence which hops 1400 times per second, and transmits a time slot having a length of 625 μs for each channel.

The Link Manager layer 16 controls overall operations (link setup, control and security) of a Bluetooth connection by utilizing Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 defines a service profile which uses the Bluetooth BR/EDR and an application protocol for exchanging data; and the Generic Access Profile (GAP) 24 defines device discovery, connection, and security level.

As shown in FIG. 4(*b*), the Bluetooth LE protocol stack includes a controller stack 30 which may be operated to process a wireless device interface for which timing is important and a host stack 40 which may be operated to process high level data.

First, the controller stack 30 may be implemented by using a communication module which may include a Bluetooth wireless device, for example, a processor module which may include a processing device such as a microprocessor.

The host stack may be implemented as part of the OS operating on the processor module or as an instantiation of a package on the OS.

In some examples, the controller stack and host stack may be operated or executed on the same processing device within the processor module.

The controller stack 30 includes a physical layer (PHY) 32, link layer 34, and host controller interface 36.

The PHY (wireless transceiver module) 32 is a layer which transmits and receives a 2.4 GHz radio signal and uses Gaussian Frequency Shift Keying (GFSK) modulation and a frequency hopping technique employing 40 RF channels.

The link layer 34, which performs the role of transmitting or receiving Bluetooth packets, performs an advertising and scanning function by using three advertising channels, generates a connection between devices, and provides a function of exchanging data packets of up to 257 bytes through 37 data channels.

The host stack may include a logical link control and adaptive protocol (L2CAP) 41, security manager (SM) 42, attribute protocol (ATT) 43, generic attribute profile (GATT) 44, generic access profile 45, and LE profile 46. However, the host stack 40 is not limited to the aforementioned description and may include various protocols and profiles.

The host stack multiplexes various protocols and profiles provided by upper Bluetooth layer by using the L2CAP.

First, the L2CAP may provide one bilateral channel for transmitting data to a specific protocol or profile.

The L2CAP 41 may operate to multiplex data among upper layer protocols, segment and reassemble packages, and manage multicast data transmission.

By default, Bluetooth LE uses three fixed channels (one for signaling channel, one for security manager, and one for attribute protocol). And depending on the needs, a dynamic channel may be used.

On the other hand, Basic Rate/Enhanced Data Rate (BR/EDR) uses a dynamic channel by default; and supports protocol service multiplexer, retransmission, and streaming mode.

The security manager (SM) 42 authenticates a device and manages the overall security of the Bluetooth LE as a protocol for providing key distribution.

The ATT 43 defines a rule for accessing data of a partner device in a server-client structure. ATT provides the following six message types (Request, Response, Command, Notification, Indication, and Confirmation).

① Request and Response message: Request message is a message for requesting and sending specific information from a client device to a server device, and Response message is a message responding to the Request message, which refers to a message transmitted from a server device to a client device.

② Command message: Command message is a message transmitted by a client device to a server device mainly to indicate a command for a specific operation, and the server device does not transmit a response to the command message to the client device.

③ Notification message: Notification message is a message transmitted by a server device to a client device to notify of an event, and the client device does not transmit a confirm message for the notification message to the server device.

④ Indication and confirm message: Indication and confirm message is a message transmitted by a server device to a client device to notify of an event, but differently from the notification message, the client device transmits a confirm message for the indication message to the server device.

The generic access profile 45 is a layer newly implemented for Bluetooth LE technology and is used to control role selection and multi-profile operation for communication among Bluetooth LE devices.

Also, the generic access profile 45 is mainly used for device discovery, connection establishment, and security process; defines a method for providing information to the user; and defines attribute types as follows.

① Service: A combination of behaviors related to data. Defines a basic operation of a device.

② Include: Defines a relationship between services

③ Characteristics: Data values used by a service

④ Behavior: A Universal Unique Identifier (UUID)-based format which may be read by a computer The LE profile 46 comprises GATT-dependent profiles and is mainly applied to Bluetooth LE devices. For example, the LE profile 46 may have Battery, Time, FineMe, and Proximity; and specifics of the GATT-based profiles are as follows.

Battery: Method for exchanging battery

Time: Method for exchanging time information

FindMe: Provides an alarm service according to distance

Proximity: Method for exchanging battery

Time: Method for exchanging time information

The GATT 44 may be operated as a protocol which describes how the attribute protocol 43 is used when services are created. For example, the GATT 44 may be operated to define how attributes are grouped into services and operated to described characteristics related to the services.

Therefore, the GATT 44 and the ATT 43 describe status of a device and services and may use characteristics to describe in which way the characteristics are related to each other and how the characteristics are used.

In what follows, procedures of Bluetooth Low Energy (BLE) technology will be described briefly.

The BLE procedure may be divided into a device filtering procedure, advertising procedure, scanning procedure, discovering procedure, and connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

An advertising device performs an advertising procedure to perform omnidirectional broadcasting to devices within coverage.

Here, omnidirectional broadcasting refers to broadcasting in all directions rather than broadcasting in specific directions.

Differently from the above, directed broadcasting refers to broadcasting in specific directions. Directed broadcasting is performed without involving a connection procedure between an advertising device and a device in a listening status (hereinafter, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ_PDU to the advertising device or when the advertising device receives a CONNECT_REQ_PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |

TABLE 1-continued

| PDU Type | Packet Name |
| --- | --- |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 4 illustrates one example of Generic Attribute Profile (GATT) structure of Bluetooth low energy technology.

Referring to FIG. 4, a structure for exchanging profile data of Bluetooth Low Energy technology may be described.

More specifically, GATT defines a method for exchanging data by using service and characteristic between Bluetooth LE devices.

In general, a peripheral device (for example, a sensor device) plays the role of a GATT server and provides a definition about a service and characteristic; and a central device plays the role of a GATT client.

In order to read or write data, a GATT client sends a data request to the GATT server, and every operation (transaction) is started by the GATT client and a response is received from the GATT server.

Figure 5:
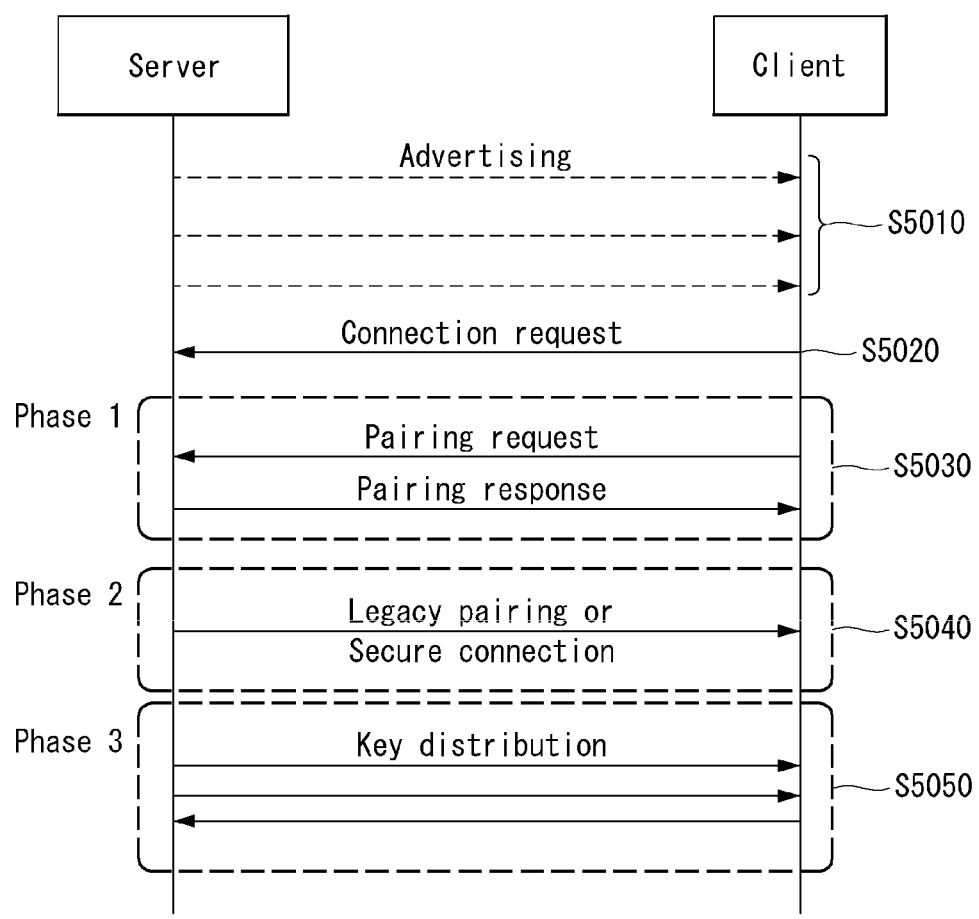
FIG. 5 is a flow diagram illustrating one example of a method for connection procedure using Bluetooth low energy technology to which the present invention may be applied.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute FIG. 5 is a flow diagram illustrating one example of a method for connection procedure using Bluetooth low energy technology to which the present invention may be applied.

The server transmits an advertising message through three advertising channels S5010.

The server may be referred to as an advertiser before it is connected while it may be referred to as a master after it is connected. As one example of the server, a sensor (for example, a temperature sensor) may be considered.

Also, the client may be referred to as a scanner before it is connected while it may be referred to as a slave after it is connected. As one example of the client, a smartphone may be considered.

As described above, Bluetooth performs communication by dividing 2.4 GHz band into a total of 40 channels. Three out of the 40 channels are advertising channels and are used to exchange packets transmitted and received to establish a connection, including various advertising packets.

The remaining 37 channels are used for data exchange after being connected as data channels.

After receiving the advertising message, the client may transmit a scan request message to the server to obtain additional data (for example, a server device name).

In this case, the server transmits, to the client, a scan response message including additional data in response to the scan request message.

Here, the scan request message and the scan response message are one type of the advertising packet, which may include only user data composed of 31 bytes or less.

Therefore, in the presence of data of which the size is 3 bytes but which has large overhead to be transmitted by establishing a connection, the data is transmitted twuce by being divided into two smaller blocks via the scan request message/scan response message.

Next, the client transmits a connection request message for configuring a Bluetooth connection to the server S5020.

Through the operation above, a link layer (LL) connection is established between the server and the client.

Afterwards, the server and the client performs a security establishment procedure.

A security establishment procedure may be interpreted as secure simple pairing or performed by including the secure simple pairing.

In other words, the security establishment procedure may be performed through phases 1 to 3.

More specifically, a pairing procedure (phase 1) is performed between the server and the client 55030.

During the pairing procedure, the client transmits a pairing request message to the server, and the server transmits a pairing response message to the client.

Devices exchange information about authentication requirements, Input/Output (I/O) capabilities, and key size through the paring procedure. Through this information, phase 2 determines which key generation method to use.

Next, in the phase 2, legacy pairing or secure connection is performed between the server and the client S5040.

In the phase 2, 128 bits of temporary key and short term key (STK) are created to perform the legacy pairing.

Temporary key: A key created to generate STK
Short term key (STK): A key value used for establishing an encrypted connection between devices If a secure connection is performed in the phase 2, 128 bits of long term key (LTK) is created.

Long term key (LTK): A key value used not only for an encrypted connection between devices but also for a connection afterwards Next, in the phase 3, a key distribution procedure is performed between the server and the client S5050.

Through the procedure, a secure connection is established between the server and the client, and an encrypted link is formed to exchange data.

In what follows, a method for transmitting and receiving a long attribute value will be described.

The longest attribute which may be transmitted in a single packet is ATT_MTU-1 octet. Here, ATT_MTU means the largest size of a packet transmitted between a client and a server.

At least, attribute opcode is included in an attribute PDU. The attribute value may be defined to be larger than the ATT_MTU-1 octet, and an attribute exhibiting this property is called a long attribute.

In order to read the whole value of an attribute longer than the ATT_MTU-1 octet, a read blob request message is used. By using the read blob request message, the first ATT_MTU-1 octet of a long attribute value may be read out.

In order to write the whole value of an attribute longer than the ATT_MTU-3 octet, a preparation write request message and execution write request message may be used. By using the write request message, the first ATT_MTU-3 octet of a long attribute value may be written.

It is difficult to determine whether an attribute value is longer than the ATT_MTU-3 octet which uses a specific protocol. The higher layer specification specifies that a given attribute may have the maximum length longer than the ATT_MTU-3 octet.

The maximum length of an attribute value is 512 octets. In other words, the longest length of data that may be stored in one characteristic is 512 octets.

However, if data exceeding the maximum length that may be stored in one characteristic is generated, there is no method to transmit and receive the data through the ATT protocol.

Therefore, to solve the problem above, if data exceeds the maximum length that may be stored in one characteristic, the present invention proposes a method for transmitting and receiving the data through one characteristic by splitting the data.

Figure 6:
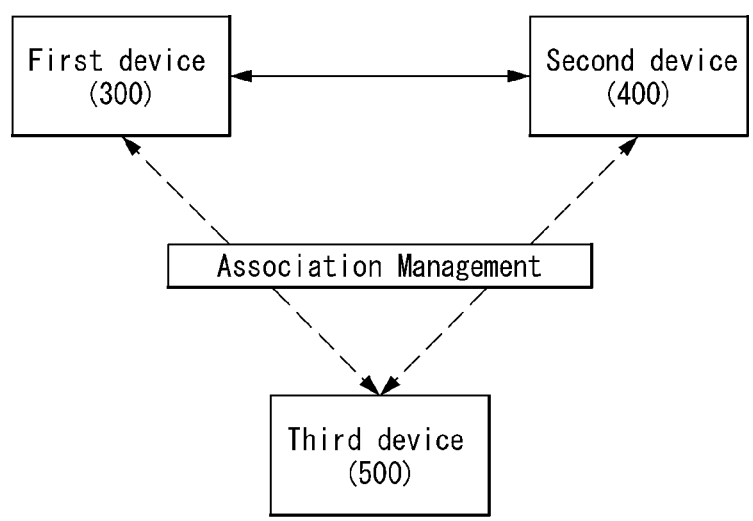
FIG. 6 illustrates a method for controlling a connection of other device through a control device proposed by the present specification.

FIG. 6 illustrates a method for controlling a connection of other device through a control device proposed by the present specification.

As shown in FIG. 6, a third device 500 is needed to control the operation between the first device 300 and the second device 400, where the third device 500 requires a new control protocol to control association of the first 300 and the second device 400.

In what follows, a device for controlling the operation of the first 300 and the second device 400 is called a control device or a third device 300.

At this time, the third device 500 has to know the information of devices (for example, association information, interface information, and service information) to control the operation of the devices.

Also, if the information of such devices exceeds a predetermined size, a separate method for transmitting and receiving the information is needed.

Figure 7:
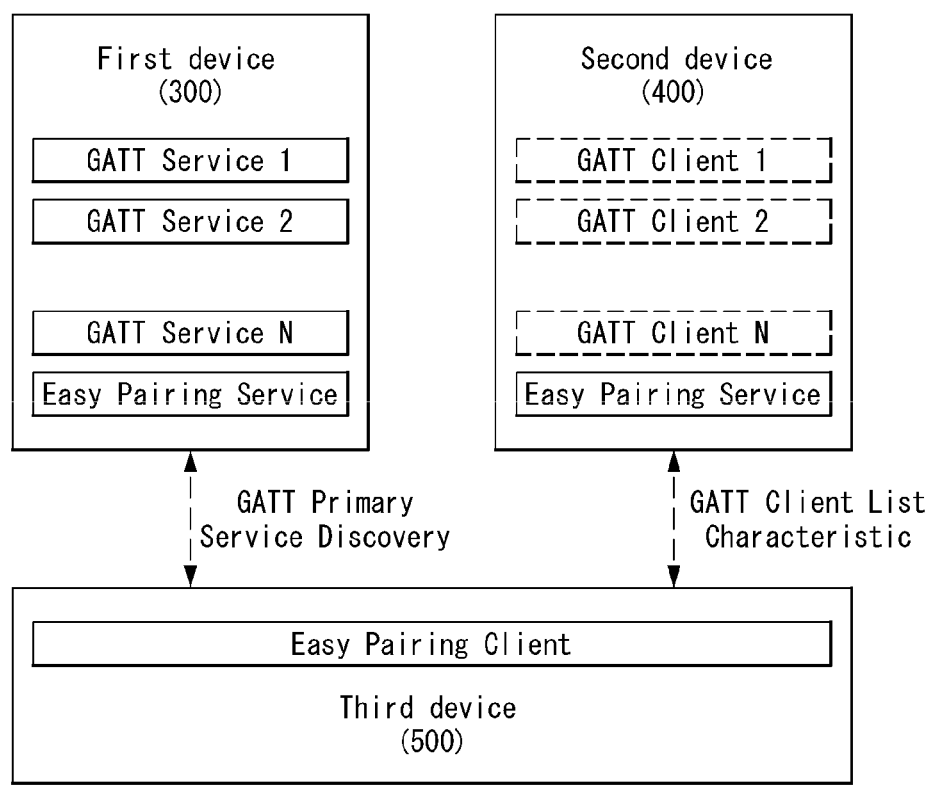
FIG. 7 illustrates one example of a profile structure for providing a service for controlling a device proposed by the present specification.

FIG. 7 illustrates one example of a profile structure for providing a service for controlling a device proposed by the present specification.

In Bluetooth, a service by which a specific device may control and manage pairing with and/or a connection to other Bluetooth device is called an easy pairing service. In FIG. 7, a third device 500 may control pairing and/or a connection between the first 300 and the second device 400 by using the easy pairing service.

Referring to FIG. 7, the third device 500 may connect the first 300 and the second device 400 with each other through the easy pairing service.

More specifically, after searching for the GATT services of the first device 300 through the primary service discovery procedure, the third device 500 may discover GATT clients of the second device 400, which is a peer device of the first device 300, together with their characteristic.

Through the operation above, the third device 500 may know the GATT service that may be used between the first 300 and the second device 400.

Based on the GATT service that may be used between the first 300 and the second device 400, the third device 500 may control pairing and/or a connection between the first 300 and the second device 400.

As described above, by using the easy pairing service, the third device 500 may manage pairing and/or a connection based on which association relationship is formed by the first 300 and the second device 400 with which device.

Although Bluetooth is based on one-to-one association, a plurality of devices may form an association relationship with one device through Bluetooth in a near future. In other words, one-to-many association may be possible.

However, if the number of devices bonded, paired, or connected to a server device is large, a problem may occur that all of the association information of a device may not be provided by using the size of a currently defined characteristic.

For example, if a home network is formed, a plurality of devices may be associated with each other. If a server device is associated with a plurality of sensors (for example, window sensor, temperature sensor, light sensor, and humidity sensor), the server device may not be able to include all of the information related to the devices associated with one characteristic.

Also, if the association status between devices is changed, no method and message format is defined for transmitting only the changed association status information and/or information related thereto to a control device.

Therefore, to solve the problem above, a method is proposed that specific information is split into multiple pieces of information, and the split information is stored in one characteristic in turn to transmit all of the split information to a client device.

Also, if part of association status is changed, a method for transmitting only the changed association status information and/or information related thereto is proposed.

FIG. 8 is a flow diagram illustrating one example of a method for transmitting and receiving association status information and/or information related thereto proposed by the present specification.

Referring to FIG. 8, if specific data exceeds a size that may be stored in one characteristic, a server may store the data in the characteristic by splitting the specific data into a plurality of data.

More specifically, a client and a server may form a BLE connection through the connection procedure described above.

If association status information and association status to be stored in the server are changed after a BLE connection to the server is established, the client performs a configuration procedure in conjunction with the server to configure an indication behavior of the server to inform of the changed association status.

The client transmits association status information of the server and a write request message requesting writing of a configuration characteristic for configuration of an indication operation S8010.

The write request message includes configuration information for configuring association status information; and the configuration information may include association type information representing an association type such as connection, bonding, or pairing; number information representing the number of association status to be stored; indicated association type information representing association status to be transmitted to the client among changed association status; maximum number information representing the maximum number of association types to be transmitted through an indication message; and interval information representing a transmission interval of an indication message.

The server which has received a write request message from the client transmits a write response message to the client in response to the write request message S8020.

Afterwards, the server stores association status information and/or information related thereto based on the write request message received from the client and generates a plurality of data by dividing the stored association status information and/or information related thereto according to the size of a characteristic.

More specifically, ① the server may configure association information to be stored in the characteristic among all of the association information. Association information may be configured by receiving configuration information related to the configuration of association information from the client or may be configured directly by the server.

For example, when receiving configuration information related to the configuration of association information among association information from the client, the server performs configuration by acquiring only the association information related to a connected device. Through this operation, the server device may perform configuration by acquiring association information of all of the devices associated with the server device itself or perform configuration by acquiring association information including at least one of connection information, bonding information and/or pairing information.

If the configured association information exceeds the maximum size that may be stored in one characteristic, the server may divide the configured association information into a plurality of data according to the maximum size. In what follows, each of the plurality of divided data will be referred to as a bank.

② Afterwards, the server selects each divided bank according to the order thereof and stores the selected bank in a characteristic. In other words, divided banks are selected according to a specific order, and the selected bank is stored in a related characteristic (in what follows, association status characteristic).

The client may acquire association information stored in the server through a readout procedure.

More specifically, the client transmits, to the server, a request message requesting an attribute value of a characteristic in which association information is stored S8030.

At this time, if the attribute value stored in the characteristic is longer than the ATT_MTU-1 octet which is the length of the longest attribute value that may be transmitted by using a single packet, the client may read the first ATT_MTU-1 octet of the attribute value of a characteristic by transmitting a read blob request message to the server.

When receiving a message requesting the attribute value of the association status characteristic from the client, the server transmits the attribute value of the association status characteristic to the client through a read response or read blob response messages S8040.

Afterwards, the client may receive all of the attribute values stored in the characteristic by performing the S8030 and S8040 steps repeatedly in conjunction with the server.

After transmitting all of the attribute values of the association status characteristic to the client, the server selects the next bank according to a specific order and updates (or changes) the attribute value of the characteristic to that of the selected bank.

For example, a write request message requesting writing of a specific characteristic (for example, characteristic of a control point) which instructs change of the attribute value of the characteristic is transmitted to the server S8050.

If receiving a write request message from the client, the server transmits a write response message to the client in response to the write request message S8060 and updates (or changes) the attribute value of the association status characteristic to that of other bank S8070.

At this time, the client may change the attribute value of the association status characteristic to that of a specific bank irrespective of the order of the bank by transmitting the write request message by including a value representing a bank to be changed.

After changing the attribute value of the association status characteristic, the server may transmit the updated attribute value of the characteristic to the client by performing the same operations of the S8030 and S8040 steps, S8080, S8090.

As described above, if data which exceeds the maximum size that may be stored in one characteristic is generated, the data may be stored in one characteristic by dividing the data according to the maximum size. And by storing the divided data in one characteristic in turn according to a specific order, the data which exceeds the maximum size may be transmitted to the client through one characteristic.

FIGS. 9 and 10 illustrate one example of a data format and a characteristic for transmitting and receiving large-sized association status information and/or information related thereto through a specific characteristic proposed by the present specification.

FIG. 9 illustrates one example of each message and characteristic for transmitting and receiving association status information.

FIG. 9(a) illustrates one example of a read response message for informing a client of a header of a read block response message for transmitting the attribute value of an association status characteristic and which type of association information has been configured by a server; or a header of a separate message.

The definition of each field is as follows.

Association Status Info: This field provides summary information of the association status information and includes the following information. This field may be reused for each bank.

Completed List (CL) (1 bit): This bit represents whether all of the association information has been divided.

Paired Device List (4 bit): These bits represent whether information of a paired device is included and association status, each bit of which represents LE Secure Connection Pairing, Authenticated MITM Protection, Unauthenticated no MITM protection, and No Security requirements.

Connected Device List (1 bit): This bit represents whether information of a connected device is included Bonded Device List (1 bit): This bit represents whether information of a bonded device is included Association Order (2 bits): These bits represent the order of divided association information, and according to the bit values, the following order may be represented.

No Order: No order is applied
Recently Used: Recently used order
Past Used: Past used order
Frequency Used: Frequently used order
Least Used: Least used order
Bank Counter: This field represents the number of a bank stored in a current association status characteristic, and the maximum value of the Bank Counter is the same as the value of Number of Bank.
Number of Bank: This field represents the total number of divided banks.
Association Number: This field represents the number of associations of currently selected banks (the number of associated devices according to the selected banks).

FIG. 9(b) represents one example of a write request message that a client transmits to configure information to be stored in an association status characteristic or configuration characteristic of a server.

The definition of each field is as follows.
Flag: The field which provides information related to the next field (for example, if the 0-th value is set to '0', it indicates that configuration for a readout procedure is information and association status characteristic while, if it is set to '1', it indicates configuration and characteristic for transmitting a changed association status).
Reading Behavior Configuration: This field represents configuration information and the attribute value of a characteristic for configuring a readout procedure and includes the following subfields (which are included in the configuration characteristic depending on the value of the flag field).

Selected Association Type: This subfield represents the type of association status information to be configured by a server (for example, connection, bonding, or pairing).

Association Number: This subfield represents the number of pieces of association status information.

Indication Behavior Configuration: This field represents configuration information and the attribute value of a characteristic related to an indication procedure for transmitting changed association status information and includes the following subfields (which are included in the configuration characteristic depending on the value of the flag field).

Indicated Associated Type: This subfield represents the type of changed association status information to be transmitted through an indication message, which includes four pairing types (Secure connection, Authenticated, Unauthenticated, and No security required), connection and/or bonding, and so on.

Maximum Indicated Association Number: This subfield represents the maximum number of pieces of association status information that may be transmitted through an indication message Indicated Interval: This subfield represents a transmission interval of an indication message, where a server by default transmits changed association status information at each interval through the indication message. If there is no changed association status information, the server may transmit an indication message without data.

Tables 2 and 3 below show one example of a configurable transmission interval.

TABLE 2

| Index | Natural Max | Allocated bits | Allocated Max |
|---|---|---|---|
| Month | 12 | 5 bits | 31 |
| Day/Mon. | 31 | 5 bits | 31 |
| Hour/Day | 24 | 5 bits | 31 |
| Min/Hour | 60 | 6 bits | 63 |
| Sec/Min | 60 | 6 bits | 63 |
| Total | | 27 bits (<4 bytes) | |

TABLE 3

| Unit flag | Time field |
|---|---|
| 1 byte | 1 byte |
| 0x00: No time Field | 0x00-0xFF(255) |
| 0x01: second | |
| 0x02: minute | |
| 0x03: hour | |
| 0x04: Day | |
| 0x05: Week | |
| 0x06: Month | |
| 0x07-0xFF: Reserved for Future Use | |

A specific value of a transmission interval is determined by a higher layer and may be longer than 1 second.

FIG. 9(c) illustrates one example of a write request message for changing the attribute value stored in the association status characteristic and a control point characteristic.

The definition of each field is as follows.

Opcode: This field represents the opcode for changing the attribute value of an association status characteristic or initializing the association order. If the opcode is a value for changing the attribute value of the association status characteristic, a server changes the attribute value of the association status characteristic from a previous bank to the next bank according to the Bank Number field value. If the opcode is a value for initializing the association order, the server initializes the association order after a predetermined time period.

Table 4 below shows one example of the opcode and parameters for initializing the association order.

TABLE 4

| Opcode | Parameter |
|---|---|
| 0x0B(may be changed) 1 byte | Reset Time 2 bytes |

The server which has received a write request message of the control point characteristic including the opcode and parameters for initializing the association order may initialize the attribute value of the association order if the reset time becomes 0.

Bank Number: If this field represents a parameter indicating the number of a bank to be changed or a bank of a specific number, the sever changes the attribute value of the association status characteristic to that of the corresponding bank. If this field does not reveal any value, the server changes the attribute value of the association status characteristic to that of the next bank.

FIG. 10 illustrates one example of a characteristic and message for providing list information of clients related to the association status of a server.

The client list characteristic shown in FIG. 10(a) is a characteristic including the attribute value representing UUID of at least one client associated with a server.

The client list characteristic is identified by UUID <<GATT Client LIST>>. The client list characteristic is used selectively to provide client list information of a server.

The definition of each field is as follows.

Client List Info: The Client List Info field represents whether the client list characteristic provides a list of all clients and includes the information of the client list characteristic such as the type of a service UUID (16 bit, 32 bit and/or 128 bit) included in the client list characteristic.

Completed List (CL) (1 bit): This bit represents whether a server provides information of a list of all of the clients through the client list characteristic.

16 bit UUID List (1 bit): This bit represents whether a server provides a client list corresponding to the 16 bit UUID services.

32 bit UUID List (1 bit): This bit represents whether a server provides a client list corresponding to the 32 bit UUID services.

128 bit UUID List (1 bit): This bit represents whether a server provides a client list corresponding to the 128 bit UUID services.

Client UUID Selected Policy (2 bits): These bits represent the information about a selection criterion of divided client list information and may represent the following criteria as follows.

Policy Not Defined: No Criterion

Most Recently Used Client UUID First: Most recently used client UUID is selected first Most Frequently Used Client UUID First: Most frequently used client UUID is selected first Bank Counter: This field represents the number of a bank stored in a current characteristic, and the maximum value of the Bank Counter is the same as the value of Number of Bank.

Total Bank Number: This field represents the total number of divided banks.

Number of 16 bits UUID: This field represents the number of clients which use 16 bit UUID. The length of the 16 bit UUID client list field is determined by the value of this field.

16 bits UUID List: This field includes the 16-bit service UUID list of a client function implemented in the server. The number of 16-bit UUIDs is the same as the number of 16 bit UUID fields.

Number of 32 bits UUID: This field represents the number of clients which use 32 bit UUID. The length of the 32 bit UUID client list field is determined by the value of this field.

32 bits UUID List: This field includes the 32-bit service UUID list of a client function implemented in the server. The number of 32-bit UUIDs is the same as the number of 32 bit UUID fields.

Number of 128 bits UUID: This field represents the number of clients which use 128 bit UUID. The length of the 128 bit UUID client list field is determined by the value of this field.

128 bits UUID List: This field includes the 128-bit service UUID list of a client function implemented in the server. The number of 128-bit UUIDs is the same as the number of 128 bit UUID fields.

FIG. 10(b) illustrates one example of a write request message for changing the attribute value stored in the client list characteristic and a control point characteristic.

The definition of each field is as follows.

Opcode: This field represents the opcode for changing the attribute value of a client list characteristic. If the opcode is a value for changing the attribute value of the client list characteristic, a server changes the attribute value of the client list characteristic from a previous bank to the next bank according to the Bank Number field value.

Bank Number: If this field represents a parameter indicating the number of a bank to be changed or a bank of a specific number, the sever changes the attribute value of the client list characteristic to that of the corresponding bank. If this field does not reveal any value, the server changes the attribute value of the client list characteristic to that of the next bank.

Figure 11:
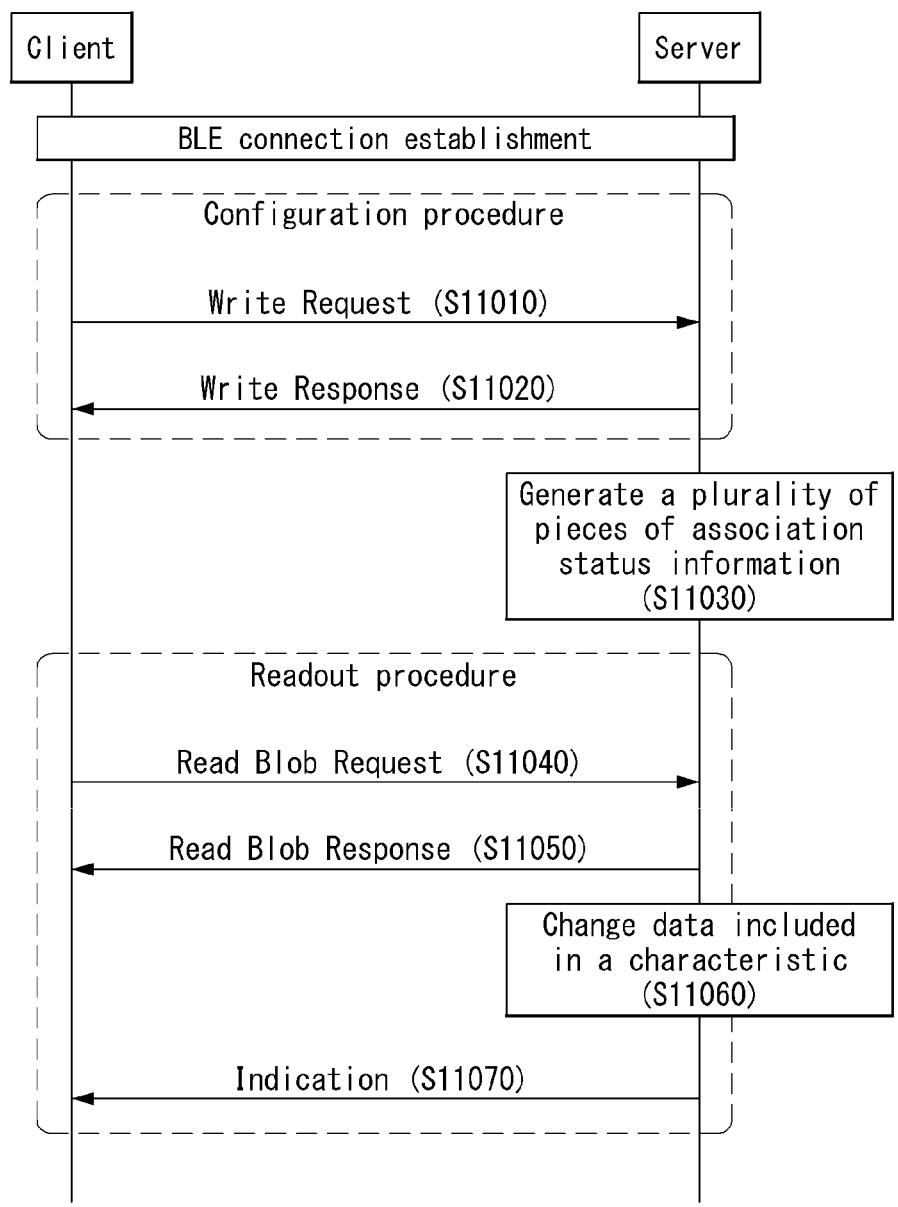
FIG. 11 is a flow diagram illustrating one example of a method for transmitting and receiving changed association status information when association status information proposed by the present specification is changed.

FIG. 11 is a flow diagram illustrating one example of a method for transmitting and receiving changed association status information when association status information proposed by the present specification is changed.

Referring to FIG. 11, if the association status of a server described with reference to FIGS. 8 to 10 and/or information related thereto is changed, the server may store the changed association status and/or information related thereto in a specific characteristic and transmit only the changed association status and/or information related thereto to a client.

First, since the steps of S11010 to S11050 of FIG. 11 are the same as the steps of S8010 to S8040 of FIG. 8, descriptions thereof will be omitted.

If part of association status information stored in the association status characteristic is changed, the server which has transmitted its association status and/or information related thereto to the client updates changed information among the association status information stored in the association status characteristic. Also, the server stores only the changed association status information in a separate specific characteristic.

Afterwards, even if the server does not receive a message requesting reading of the association status characteristic from the client, the server transmits the changed association status information and information related thereto stored in the specific characteristic to the client according to the configuration made through the indication message described with reference to FIGS. 8 to 10, S11070.

Therefore, except for the association status information which has not been changed, the server may transmit only the changed association status information and information related thereto to the client.

Figure 12:
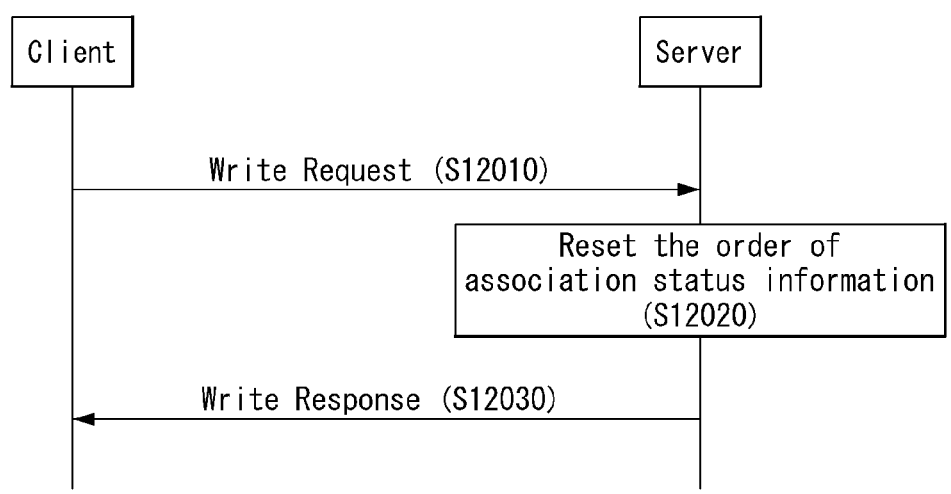
FIG. 12 is a flow diagram illustrating one example of a method for initializing the order of association status information stored in a server proposed by the present specification.

FIG. 12 is a flow diagram illustrating one example of a method for initializing the order of association status information stored in a server proposed by the present specification.

Referring to FIG. 12, a client transmits a write request message requesting writing of a control point characteristic to a server to initialize the order of association status information of the server or changed association status information S12010.

The write request message may include the opcode and parameter described in FIG. 9 and Table 4.

The server transmits a write response message in response to the write request message and if the reset time value which is a parameter of the written opcode becomes 0, resets the order of association status information or changed association status information S12020, S12030.

Through the method above, the client may initialize the order of the association status information and information related thereto stored in the characteristic of the server and change them.

Figure 13:
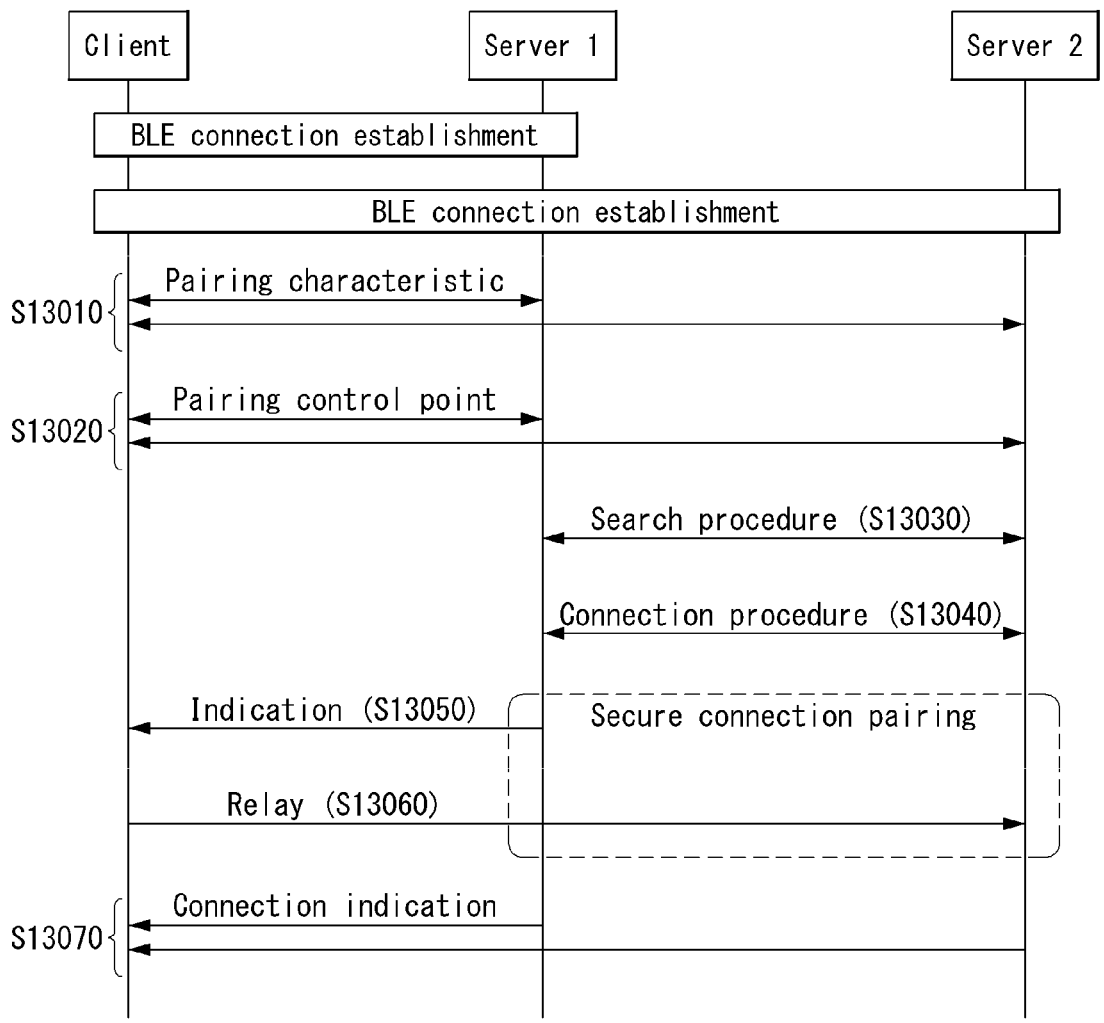
FIG. 13 is a flow diagram illustrating one example of a method for controlling connections of devices based on the association status information proposed by the present specification.

FIG. 13 is a flow diagram illustrating one example of a method for controlling connections of devices based on the association status information proposed by the present specification.

Referring to FIG. 13, the client may control servers to establish a secure connection by using an easy pairing server.

More specifically, the client forms a secure BLE connection to server 1 and server 2. In other words, the client, server 1, and server 2 form a secure connection from hacking of a third device.

Afterwards, from the server 1 and the server 2, the client may obtain a pairing characteristic message including a secure mode and a secure level supported by the server 1 and the server 2. At this time, the client may obtain a pairing characteristic message through a readout procedure. In other words, the client may transmit a read request message requesting the attribute value of the pairing characteristic to the server 1 and the server 2; and receive a read response message including the secure mode and secure level corresponding to the attribute value of the pairing characteristic from the server 1 and the server 2, S13010.

The client may recognize the secure mode and secure level supported by the server 1 and the server 2 through the pairing characteristic message or read response message transmitted from the server 1 and the server 2.

Afterwards, the client transmits a write request message requesting writing of a pairing control point characteristic to the server 1 and/or the server 2 to instruct connection establishment through the secure mode and secure level commonly supported by the server 1 and the server 2.

At this time, the write request message may include an opcode instructing connection establishment and parameters related to the opcode.

The server 1 and the server 2 transmit a write response message to the client in response to the write request message S13020.

Afterwards, the server 1 and the server 2 discover each other through a search procedure S13030 and performs a connection procedure according to the common secure mode and secure level S13030.

At this time, if the server 1 and the server 2 support secure connection only mode, the server 1 and the server 2 may form secure connection pairing.

The server 1 and the server 2 transmit a confirm value indication message to the client to form secure connection pairing S13050.

Since a secure connection is already established between the server 1 and the client, external devices may not check the message transmitted and received between the server 1 and the client.

The confirm value indication message may include the address of the server 1, random value, and a confirm value 1 generated by the address of the server 1 and the random value.

The client transmits, to the server 2, the address of the server 1, random value, and confirm value 1 received from the server 1 by including them in a confirm value relay message S13060.

Since a secure connection is already established between the server 2 and the client, external devices may not check the message transmitted and received between the server 2 and the client.

The server 2 generates a confirm value 2 based on the address of the server 1 and random value included in the confirm value relay message and compares the confirm value 1 with the confirm value 2.

If the confirm value 1 is different from the confirm value 2, the server 2 does not form a connection to the server 1, but if the confirm value 1 is the same as the confirm value 2, the server 2 forms a secure connection to the server 1.

Afterwards, the server 1 and/or the server 2 transmits, to the client, a connection indication message indicating that a secure connection has been established S13070.

By using the method above, the server 1 and the server 2 may form a connection secure from a third device through the client.

Figure 14:
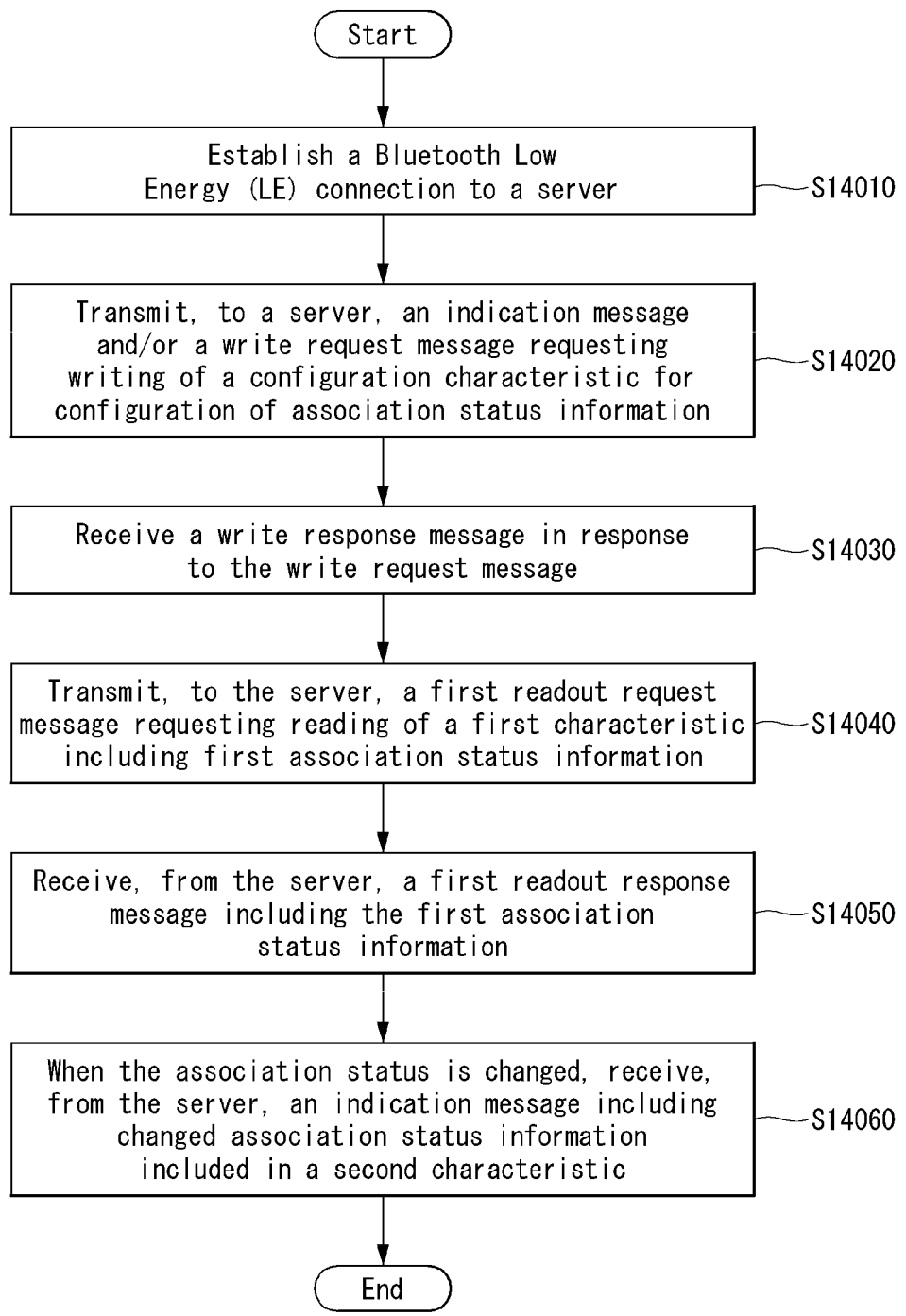
FIG. 14 is a flow diagram illustrating one example of a method for transmitting and receiving association status information proposed by the present specification.

FIG. 14 is a flow diagram illustrating one example of a method for transmitting and receiving association status information proposed by the present specification.

A client may form a BLE connection to a server through the method described with reference to FIG. 5 S14010.

The client which has established a BLE connection to the server transmits, to the server, an indication message for transmission of changed association status information and/or a write request message requesting writing of a configuration characteristic for configuration of association status information.

At this time, the write request message may include the same information as the association status characteristic and the write request message for constructing an indicating message described with reference to FIGS. 8 to 11.

The client receives a write response message in response to the write request message from the server S14030.

Afterwards, the client transmits, to the server, a first readout request message requesting reading of a first characteristic (or association status characteristic) including first association status information of the server to control association of the server by using the easy pairing service S14040.

The client receives a first readout response message including the first association status information which is the attribute value of a first characteristic in response to the first readout request message S14050.

When a part or all of the first association state information included in the first characteristic is changed, the client receives an instruction message including the changed association state information from the server S14060.

At this time, the changed association status information is included in a second characteristic, and the second characteristic includes only the changed association status information as the attribute value.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

The method for transmitting and receiving data using Bluetooth according to the present invention is not limited to the embodiments described above, but all or part of the embodiments may be combined selectively so that various modifications may be made to the embodiments.

Meanwhile, The method for transmitting and receiving data using Bluetooth according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

The present document describes both of the product invention and the process invention, and depending on the needs, descriptions of the respective inventions may be applied in a supplementary manner.

INDUSTRIAL APPLICABILITY

Examples in which the method for transmitting and receiving data using Bluetooth according to an embodiment of the present invention is applied to the Bluetooth LE system have been described, but the method may also be applied to various wireless communication systems in addition to the Bluetooth LE system.

The invention claimed is:

1. A method for transmitting and receiving data by a client to and from a server using Bluetooth, the method comprising:

establishing a Bluetooth Low Energy (LE) connection to a server;

transmitting, to the server, a first readout request message requesting reading of a first characteristic including first association status information, wherein the first association status information is part of specific association status information representing association status between the server and at least one device;

receiving, from the server, a first readout response message including the first association status information; and when the association status is changed, receiving, from the server, an indication message including changed association status information included in a second characteristic, wherein the changed association status information represents changed association status between the server and the at least one device.

2. The method of claim 1, further comprising transmitting, to the server, a write request message requesting writing of a configuration characteristic for configuration of the indication message; and
receiving a write response message in response to the write request message, wherein
the write request message includes configuration information of the indication message.

3. The method of claim 2, wherein the configuration information includes at least one of period information representing a transmission period of the indication message, association type information representing an indicated association type, or number information representing the number of association status included in the indication message.

4. The method of claim 1, further comprising performing a change procedure for changing information stored in the first characteristic to second association status information;
transmitting, to the server, a second readout request message requesting reading of the first characteristic; and
receiving, from the server, a second readout response message including the second association status information, wherein
the first association status information and the second association status information are information split from the specific association status information according to a size of the first characteristic.

5. The method of claim 4, wherein the performing a change procedure comprises transmitting, to the server, a second write request message requesting writing of a control characteristic for indicating change of information included in the first characteristic; and
receiving, from the server, a second write response message indicating that information of the first characteristic has been changed in response to the second write request message.

6. The method of claim 1, further comprising transmitting a second write request message requesting writing of a control characteristic for initializing the order of the association status included in the specific association status information; and
receiving, from the server, a second write response message representing that the order of the association status has been initialized.

7. The method of claim 1, further comprising transmitting, to the server, a second write request message requesting writing of a control characteristic indicating pairing with a specific device; and
receiving a second write response message in response to the second write request message, wherein
the second write request message includes control information for configuring a search mode for searching for neighboring devices by the server.

8. A client device transmitting and receiving data to and from a server by using Bluetooth, the device comprising:
a communication unit for communicating with an external entity in a wireless and wired manner;
a memory for storing data; and
a processor functionally connected to the communication unit, wherein the processor is configured to:
establish a Bluetooth Low Energy (LE) connection to a server;
transmit, to the server, a first readout request message requesting reading of a first characteristic including first association status information, wherein
the first association status information is part of specific association status information representing association status between the server and at least one device;
receive, from the server, a first readout response message including the first association status information; and
when the association status is changed, receive, from the server, an indication message including changed association status information included in a second characteristic, wherein
the changed association status information represents changed association status between the server and the at least one device.

9. The device of claim 8, wherein the processor is configured to transmit, to the server, a write request message requesting writing of a configuration characteristic for configuration of the indication message; and
the write request message includes configuration information of the indication message.

10. The device of claim 9, wherein the configuration information includes at least one of period information representing a transmission period of the indication message, association type information representing an indicated association type, or number information representing the number of association status included in the indication message.

11. The device of claim 8, wherein the processor is configured to perform a change procedure for changing information stored in the first characteristic to second association status information;
to transmit, to the server, a second readout request message requesting reading of the first characteristic; and
to receive, from the server, a second readout response message including the second association status information, wherein
the first association status information and the second association status information are information split from the specific association status information according to a size of the first characteristic.

12. The device of claim 11, wherein the processor is configured to transmit, to the server, a second write request message requesting writing of a control characteristic for indicating change of information included in the first characteristic; and
to receive, from the server, a second write response message indicating that information of the first characteristic has been changed in response to the second write request message.

13. The device of claim 8, wherein the processor is configured to transmit a second write request message requesting writing of a control characteristic for initializing the order of the association status included in the specific association status information; and
to receive, from the server, a second write response message representing that the order of the association status has been initialized.

14. The device of claim 8, wherein the processor is configured to transmit, to the server, a second write request message requesting writing of a control characteristic indicating pairing with a specific device; and
to receive a second write response message in response to the second write request message, wherein the second write request message includes control information for configuring a search mode for searching for neighboring devices by the server.

\* \* \* \* \*